United States Patent [19]

Nayar et al.

[11] Patent Number: 5,578,147

[45] Date of Patent: Nov. 26, 1996

[54] CONTROLLED PROCESS FOR THE HEAT TREATING OF DELUBED MATERIAL

[75] Inventors: Harbhajan S. Nayar, New Providence; George R. White, III, North Plainfield, both of N.J.

[73] Assignee: The BOC Group, Inc., Murray Hill, N.J.

[21] Appl. No.: 440,431

[22] Filed: May 12, 1995

[51] Int. Cl.⁶ .................................................. C04B 35/64
[52] U.S. Cl. .................... 148/508; 134/19; 264/40.1
[58] Field of Search ................... 148/508; 134/5, 134/10, 18, 19, 20; 264/40.1, 63, 64, 344

[56] References Cited

U.S. PATENT DOCUMENTS

| | | | |
|---|---|---|---|
| 4,495,148 | 1/1985 | Sarnes et al. | 419/57 |
| 4,795,598 | 1/1989 | Billiet | 264/40.6 |
| 4,840,680 | 6/1989 | Wang | 134/19 |
| 5,016,809 | 5/1991 | Winterbottom et al. | 134/2 |
| 5,078,929 | 1/1992 | Matsumae et al. | 264/40.1 |

*Primary Examiner*—Sikyin Ip
*Attorney, Agent, or Firm*—R. Hain Swope; David A. Draegert

[57] ABSTRACT

Process and apparatus for the heat treating of a part suspected of containing a lubricant in which the part is preheated to a temperature at which the lubricant vaporizes, the vaporized lubricant is converted to at least one gaseous by-product, the concentration of at least one of the by-products is then measured and heat treating of the part is conducted when the concentration of the measured by-product or total C—H bonds thereof reaches a predetermined value.

30 Claims, 5 Drawing Sheets

CONTROLLED PROCESS FOR THE HEAT TREATING OF DELUBED MATERIAL

TECHNICAL FIELD

The present invention is directed to a batch or continuous process and apparatus for heat treating a part made of a starting material comprised of a metal and/or ceramic in which the part is preheated and the atmosphere tested to determine the presence of by-products which are indicative of the presence of residual lubricants. The residence time and/or the preheating conditions of the part in the preheating stage of the heat treating process is controlled so that heat treating takes place in the substantial absence of the lubricants.

BACKGROUND OF THE PRIOR ART

In the manufacture of metal and/or ceramic parts, it is common to form the starting material into the desired shape of a part and then to heat treat the part. The starting material is typically blended and/or coated with a lubricant or binder and may include optional additives as well.

For example, if the starting material is a powder the lubricant is added principally to increase the bulk density of the uncompacted powder. In addition, the lubricant allows a reduction in the pressure used to compact the powder to its specified density and shape. Still further, the force required to remove the compacted part from the mold used in the compacting process can also be reduced. Thus, the use of lubricants in the compacting of powders to form preheated parts is highly recommended.

In another example, solid strips of starting material (e.g. metals or metal alloys) may be coated with one or more lubricants prior to or during rolling to reduce the thickness of the strip.

Despite the advantages of using lubricants, there is a significant disadvantage associated with lubricants. Most lubricants have a decomposition temperature below the typical temperatures used to heat treat the part. Accordingly, the lubricants decompose into undesirable by-products including carbon or soot. This process results in an unattractive surface finish on the heat treated part and a coating of soot in the heat treating zone of the furnace.

There have been efforts to avoid and/or eliminate the presence of the decomposition products of lubricants, although such efforts have not been commercially successful. For example, Sidney G. Roberts, U.S. Pat. No. 4,104,061, discloses a process of removing gaseous or volatile contaminants from metal powders or compacts by employing a vacuum treatment followed by back filling with an innocuous depurative gas capable of forming a solid reaction product with the metal or the impurities in the metal. The gaseous reaction product is then removed.

John Blachford, U.S. Pat. No, 4,106,932, is directed to a new type of lubricant composition in the form of discrete pressure-rupturable microcapsules composed of a core containing a liquid lubricant surrounded by a shell of a degradable polymeric material and optionally a solid lubricant.

George M. Brasel, U.S. Pat. No. 5,059,387, discloses the use of a lubricant having as its primary constituent a thermosetting condensation resin.

Despite these efforts, the problems associated with the decomposition of lubricants in the heat treating zone and the deleterious affects on both the heat treated part and the walls of the furnace remain. It would therefore be a significant advance in the art of heat treating parts to effectively and economically conduct the heat treating process only after the lubricants have been substantially removed from the part prior to heat treating. In meeting this objective, it would be desirable to monitor the concentration of the lubricants in and/or on the part and only when the concentration is reduced to a predetermined value would the heat treating process commence. In this way, the level of the lubricants in the heat treating zone is minimized resulting in a desirable product and substantially reduced soot levels in the heat treating section of the furnace.

SUMMARY OF THE INVENTION

The present invention is generally directed to a method and apparatus for heat treating a part made from a starting material which includes a metal and/or ceramic in porous or solid form. The method and apparatus include means for detecting the concentration of gaseous by-products and based on the detected concentration, controlling the heat treating process to minimize the formation of soot. The concentration of these by-products in the preheating atmosphere is related to the amount of lubricant remaining in the part. When the monitored concentration reaches a predetermined value, preferably indicative of the substantial absence of the lubricant, the part may be heat treated in the substantial absence of carbon. The process of the present invention results in heat treated parts having a desirable finish and the furnace being substantially devoid of soot.

More specifically, the present invention is directed to a process and apparatus for the heat treating of a part comprising a metal, a metal alloy, ceramic or combination thereof suspected of containing at least one lubricant:

a) transporting the part into a furnace;

b) preheating the part to at least the temperature at which the lubricant vaporizes;

c) converting the vaporized lubricant into at least one gaseous by-product;

d) measuring the concentration of at least one of the by-products; and e) heat treating the part when the concentration of the at least one measured by-product reaches a predetermined value,

BRIEF DESCRIPTION OF THE DRAWINGS

The following drawings in which like reference characters illustrate like parts are illustrative of embodiments of the invention and are not intended to limit the invention as encompassed by the claims forming part of the application.

DETAILED DESCRIPTION OF THE INVENTION

Figure 1:
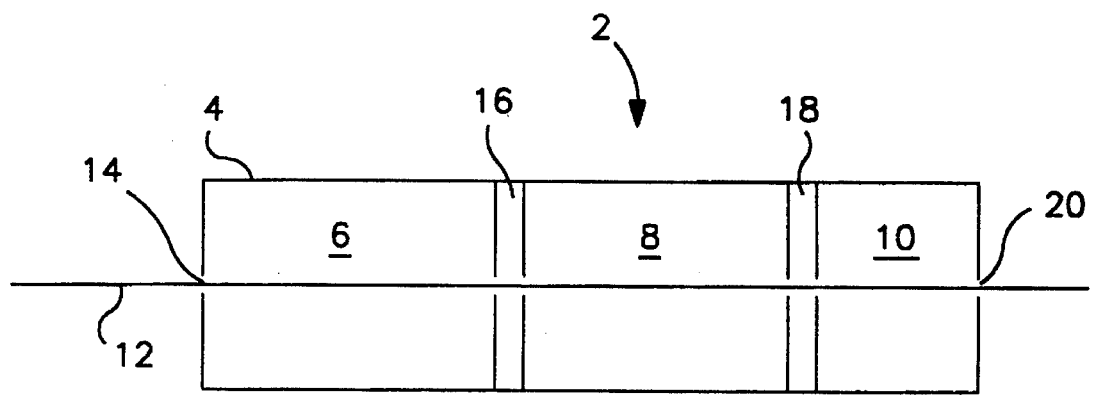
FIG. 1 is a schematic view of a conventional heat treating furnace for the continuous heat treating of parts containing a preheating zone, a heat treating zone and a cooling zone.

The present invention is directed to a method and apparatus for the continuous and batchwise heat treating of porous and/or solid parts made of metal, metal alloys, ceramic or combinations thereof and particularly to conducting the heat treating operation when it is known that the part is preferably substantially free of lubricant.

As used herein, the term "starting material" shall mean metals, metal alloys, ceramics or combinations thereof (e.g. cermets) in the form of powders, strips, billets, ingots, wire, rods, bars and the like combined with at least one lubricant. The term "part" shall include porous or solid shaped objects made from the starting materials. The term "heat treating" shall be used in its customary broad sense to include the heating of parts to elevated temperatures, including but not limited to sintering, brazing and annealing and the like.

The term "continuous" shall mean apparatus and methods in which the preheating and heat treating zones of a furnace are separate and distinct. The term "batch" or "batchwise" shall mean apparatus and methods in which the preheating and heating operations are carried out in the same location (e.g. in the same chamber). The term "protective atmosphere" shall include inert atmospheres comprised of substantially pure inert gases (e.g. nitrogen gas), substantially non-oxidizing atmospheres (e,g. hydrogen gas, hydrogen-nitrogen mixtures, disassociated ammonia, endothermic atmospheres), vacuums and the like.

The heat treating of parts made from starting materials as defined above is known in the art and is typically conducted in a continuous manner in a furnace having a preheating zone, a heat treating zone and a cooling zone. Prior to entering the furnace, the starting material is formed into a part having a predetermined shape. The shaping processes include, for example, compacting, powder injection molding, drawing, rolling, extruding and the like.

The heat treating of parts may also take place in a batchwise furnace. The part is placed into a single chamber on a fixed, non-moving substrate. Preheating, heating and cooling of the part are conducted within the single chamber. The parts treated in a batchwise furnace are likewise formed from the starting material as defined above.

As used herein the term "lubricant" shall be deemed synonymous with the term "binder" and shall include all compounds whether solid, liquid or mixtures thereof which increase the bulk density of the starting material and/or reduce the pressure or friction needed to shape the starting material. Typical examples of such lubricants include; ethylene bisstearamide; zinc stearate; thermosetting resins such as furfuryl alcohol, urea formaldehyde, phenol formaldehyde and melamine formaldehyde; animal and vegetable fats and oils such as rapeseed oil, soya-bean oil, peanut oil and coconut oil; fatty acids and fatty acid esters such as oleic acid and methyl laureate; epoxidized fats and oils such as epoxidized soya-bean oil; fatty acid esters of polyols such as glycerol, trimethylol propane, pentaerythritol, polymethylene glycol, polyethylene glycol, polypropylene glycol; polypropylene; paraffin waxes; combinations thereof and the like. The nature and type of lubricant used in the starting material is not limited providing that during preheating the lubricant vaporizes. In some cases, the vaporized lubricant is converted into detectable smaller compounds (i.e. by-products) without decomposing into carbon (i.e. soot) at the preheating temperatures. With other lubricants, samples of the atmosphere may be removed from the furnace and the vaporized lubricants or by-products further treated to produce detectable by-products that are gaseous as described in more detail hereinafter.

These by-products are typically comprised of carbon-containing compounds, most often long chain hydrocarbons or derivatives thereof. The detectable by-products preferably contain no more than 10 carbon atoms.

Referring to FIG. 1, there is shown a conventional heat treating furnace 2 for the continuous heat treating of parts. The furnace 2 includes a housing 4 having three separate zones; a preheating zone 6, a heat treating zone 8 and a cooling zone 10. The parts which are to be heat treated are transported through the furnace 2 on a conveyor belt 12 or by another suitable means. The heat treating process is preferably conducted in a protective atmosphere as defined herein.

The parts formed from a starting material such as a metal powder admixed with a lubricant pass into the preheating zone through an entrance 14 of the furnace 2. The parts are heated in the preheating zone to temperatures up to 1500° F., typically in the range of from about 1000° to 1500° F. At these temperatures, the typical lubricants remaining within the metal part are volatilized in the preheating zone and may also be broken down into smaller compounds.

Upon completion of preheating, the parts pass through a transition zone 16 into the heat treating zone 8. The parts are then heated to temperatures necessary to complete heat treating which may exceed, for example, 2100° F. Any lubricant which remains with the part in the heat treating zone 8 is decomposed, typically into carbon, hydrogen and other gases. The carbon generated in the heat treating zone 8 from the lubricant deposits on the parts and/or the walls of the heat treating zone. Carbon deposition results in less than satisfactory heat treated parts and frequent shut downs of the furnace to clean the walls and remove the soot.

After heat treatment, the parts pass through a second transition zone 18 into the cooling zone 10. The temperature of the parts is reduced to ambient temperatures in the cooling zone after which the cooled parts leave the furnace 2 through an exit 20.

In accordance with the present invention, there is provided a method and apparatus for controlling the heat treating process in a manner such that heat treating in the heat treating zone is not conducted until the lubricant has been removed from the parts to a predetermined level. The present invention provides a means for detecting at least one of the gaseous by-products of the lubricant as an indication that a sufficient amount of the lubricant has been removed from the preheated parts. If the amount of the by-products detected is above a predetermined value, then the preheating step is adjusted until the concentration of by-products is at the predetermined value. The adjustment can be in the form of a reduction in the speed of the conveyor belt to increase the residence time of the parts in the preheating zone. Alternatively or in addition, the temperature of the preheating step can be increased to hasten the release of the lubricant from the parts. A still further way of hastening the conversion of the lubricant to smaller gaseous compounds is to add a reactive gas such as an oxygen-containing gas (e.g. $H_2O$), a reducing gas (e.g. hydrogen gas and CO) or the like to the preheating zone which increases the reactivity of the lubricants.

Figure 2:
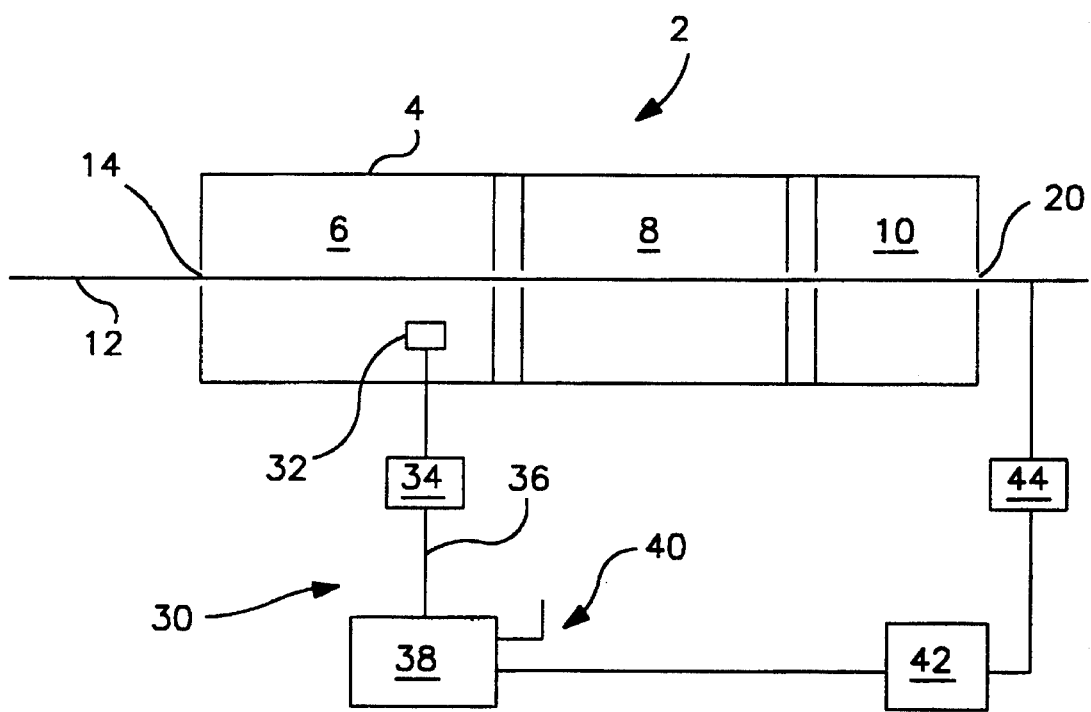
FIG. 2 is a schematic view of an embodiment of the invention for the continuous heat treating of parts in which the belt speed is controlled.

Referring to FIG. 2, there is disclosed an embodiment of the invention wherein the lubricant is vaporized and converted to detectable by-products in the preheating zone and appropriate changes are thereby made to the speed of the conveyor belt carrying the parts through the furnace based on detected levels of by-products compared to the predetermined standard.

Associated with the preheating zone 6 is a detector particularly adapted to detect at least one by-product of the vaporization and conversion of lubricants associated with the parts. As previously indicated, conventional lubricants are typically long chain carbon-containing compounds including hydrocarbons and derivatives thereof. At the temperatures employed in the preheating zone 6 of the furnace (e.g. from about 1000° to 1500° F.), the large lubricant compounds vaporize and are converted into smaller gaseous compounds having C—H bonds (e.g. hydrocarbons and derivatives thereof). The concentration of these smaller gaseous compounds is indicative of the presence of lubricant associated with the parts. As the concentration of the smaller gaseous compounds decreases to a predetermined value, there is a corresponding decrease in the level of lubricant associated with the part. By detecting the level of at least one of smaller gaseous compounds, the heat treating process may be adjusted so that only parts having reduced levels of lubricant (e.g. substantially no lubricant) will enter the heat treating zone.

The preheating zone 6 is associated with a detection system 30 including an outlet 32 for obtaining a sample of the atmosphere contained within the preheating zone 6. The sample is drawn out of the preheating zone by a pump 34 or other suitable device through a conduit 36. The sample is forwarded to an analyzer 38 capable of detecting the concentration of the smaller gaseous compounds directly by detecting a specific compound or compounds or through the detection of total C—H bonds representing the total concentration of hydrocarbons and derivatives thereof, resulting from the vaporization and conversion of the lubricant associated with the part. An example of such an analyzer is a Rascal II type analyzer (sold by The BOC Group) or an infrared-based analyzer (model Fidamat sold by Siemens Industrial Automation, Inc.).

The analyzer 38 is provided with a vent 40 for exhausting the sample gas after the analysis thereof. The analyzer 38 generates a third signal corresponding to the detected concentration of the smaller gaseous compound or the total C—H bonds and transmits the signal to a controller 42 (e.g. a Melsec A2C program logic controller sold by Mitsubishi Co.). The controller 42 compares the signal to a signal corresponding to a predetermined concentration of the smaller gaseous compound or the total C—H bonds and generates a signal corresponding to the difference thereof. The third signal is used to alter the conditions within the preheating zone 6 so as to ensure that the actual concentration of the smaller gaseous compound or the total C—H bonds equals the predetermined concentration.

As specifically shown in FIG. 2, the third signal generated by the controller 42, is transmitted to a belt speed controller 44 such as 1333 Series D Adjustable Frequency AC Drive sold by Allen Bradley Company. The controller 44 is operatively engaged to the conveyor belt 12 and, based on the third signal, adjusts the speed of the conveyor belt 12. For example, if the detected concentration of the smaller gaseous compound or the total C—H bonds is well above the predetermined concentration, then the rate at which the part is transported through the preheating zone should be reduced. A slower rate of transportation increases the residence time of the part in the preheating zone allowing increased exposure of the lubricants to the preheating temperature and therefore more complete vaporization and conversion.

Conversely, if the parts are being divested of the lubricants well before preheating is complete, as detected by a low concentration of smaller gaseous compound or total C—H bonds in the preheating atmosphere, then it is desirable to increase the belt speed. In this manner, the process is run efficiently with the part being retained in the preheating zone 6 for the minimum amount of time.

It will be noted in FIG. 2 that the belt speed controller 44 is connected to the conveyor belt 12 at the exit 20 of the furnace. In this embodiment, the conveyor belt 12 runs continuously from the entrance 14 to the exit 20. It should be understood, however, that if a separate conveyor belt is used in the preheating zone 6, the belt speed controller 44 would be connected directly to the separate belt within the preheating zone.

The conditions in the preheating zone 6 can be modified to more effectively vaporize and convert the lubricants. By controlling the conditions within the preheating zone 6, the parts may be retained therein for the minimum amount of time while being divested of the desired amount of the lubricant.

Figure 3:
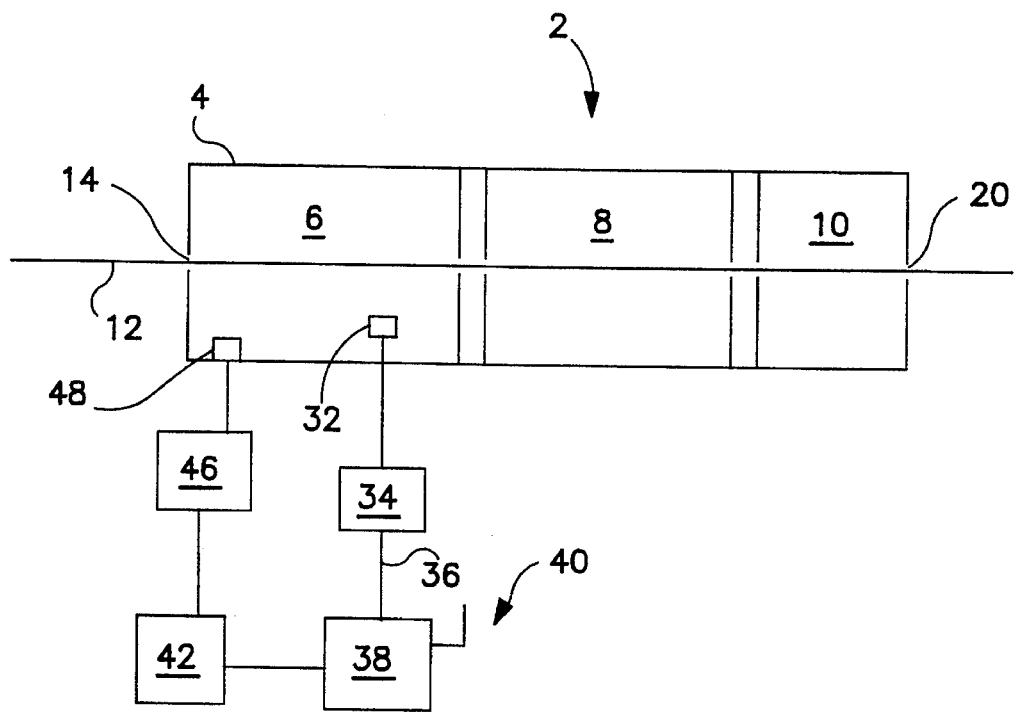
FIG. 3 is a schematic view of another embodiment of the invention for the continuous heat treating of parts in which temperature is controlled.

Referring to FIG. 3, there is disclosed an embodiment of the invention wherein the temperature of the preheating zone is controlled to modify the delubrication process. The atmosphere of the preheating zone 6 is sampled and analyzed in the same way as described above in connection with FIG. 2. Specifically, a sample of the atmosphere is removed from the outlet 32 via a pump 34 through a conduit 36 to an analyzer 38. The analyzer sends a signal corresponding to the concentration of the selected smaller gaseous compound or the total C—H bonds in the sample to the controller 42. The controller 42 generates a signal corresponding to the difference between the actual and predetermined concentrations.

In the embodiment of FIG. 3 there is provided a temperature controller 46 such as Electromax V sold by Leeds & Northrup a division of General Signal which upon receiving the signal from the controller 42 transmits a signal to a heater 48 to generate more or less heat within the preheating zone 6. For example, if the actual concentration of the smaller gaseous compound or total C—H bonds exceeds the predetermined concentration, then it is desirable to increase the temperature within the preheating zone to hasten the vaporization and conversion of the lubricants. The signal generated by the controller 42 corresponding to the difference between the actual and predetermined concentrations is transmitted to the temperature controller 46. A third signal is generated therein and is transmitted to the heater 48 to increase the temperature within the preheating zone 6.

In some operations the vaporized lubricant may not convert to smaller gaseous compounds under preheating conditions. In other operations, the lubricant vaporizes and converts but the resulting by-products may not be readily detected by conventional analysis. This may be due to the fact that some of the by-products condense and/or other by-products are present in less than readily detectable amounts. Under these circumstances, it is desirable to remove a sample of the atmosphere from the preheating zone and further treat the vaporized lubricant to form a detectable by-product or to further treat the by-product to produce a detectable amount of smaller gaseous compounds (i.e. an indirect means of detecting the presence or absence of lubricant associated with the part).

By way of example, if the lubricant vaporizes but does not convert to smaller gaseous compounds, a sample of the preheating atmosphere containing the vaporized lubricant is removed from the preheating zone. At ambient temperatures such lubricants typically condense and therefore cannot readily be analyzed by gas analysis instruments. The lubricants are therefore heated outside of the furnace to temperatures sufficient to convert the vaporized lubricant to detectable smaller gaseous compounds. The detected amount of the smaller gaseous compounds or total C—H bonds is then correlated to the relative amount of remaining lubricant associated with the part. Alternatively the lubricant may be exposed to a catalyst capable of converting the lubricant to detectable smaller gaseous compounds.

A similar mode of operation may be used to treat lubricants which upon conversion do not produce a sufficient quantity of detectable smaller gaseous compounds and/or produce by-products which condense outside of the furnace. By way of example, a particularly effective lubricant for the formation of metal parts is ethylene bisstearamide sold under the tradename Acrawax. Under typical preheating temperatures, ethylene bisstearamide vaporizes and converts to a major portion of long chain paraffins which condense outside of the furnace and a very small portion, (e.g. <0.04%) of detectable smaller gaseous compounds (i.e. ethylene).

Under these circumstances a sample of the atmosphere from the preheating zone is withdrawn and subjected to further treatment such as heating, contacting with a suitable catalyst, or both. Alternatively, the condensable long chain paraffin compounds may be filtered off and the remaining ethylene detected.

Figure 4:
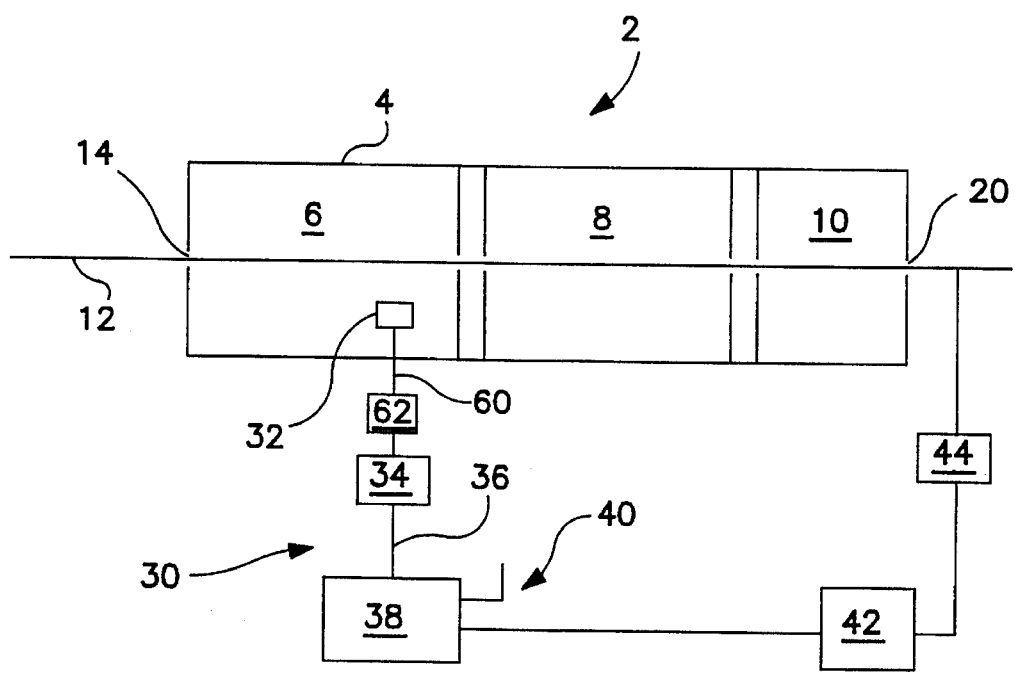
FIG. 4 is a schematic view of an embodiment of the invention for the continuous heat treating of parts in which a sample of the atmosphere is withdrawn from the furnace and further treated.

Referring to FIG. 4, there is shown a continuous furnace of the type shown in FIG. 1 used for the above-mentioned contingencies. Within the preheating zone 6, the lubricant contained within the part undergoes vaporization. The lubricant, as described above may be converted but does not produce sufficient quantities of the detectable smaller gaseous compounds.

The preheating zone 6 of the furnace 2 is provided with an outlet 32 for removing samples of the atmosphere contained within the preheating zone. The samples are sent via a conduit 60 to a converter 62 which converts the vaporized lubricant or the larger gaseous compounds (e.g. large chain paraffins) to smaller gaseous compounds (e.g. ethylene).

The converter 62 may be a heater, a catalytic converter, combination thereof or similar device for converting the vaporized lubricant or larger gaseous compound produced within the preheating zone. The resulting by-products are then sent via a pump 34 through a conduit 36 to an analyzer 38 as previously described in connection with FIG. 2.

The analyzer 38 generates a signal corresponding to the detected concentration of the smaller gaseous compounds or total C—H bonds and transmits the signal to a controller 42 of the same type employed in the embodiment described in connection with FIG. 2. The controller compares the signal to a signal corresponding to a predetermined concentration of the smaller gaseous compounds or total C—H bonds and generates a third signal corresponding to the difference thereof. The third signal may be transmitted to a belt speed controller as described in connection with FIG. 2.

In another embodiment of the invention, once the level of detectable compounds is determined, a reactive gas such as an oxygen containing gas (e.g. $H_2O$) or a reducing gas (e.g. $H_2$) may be transmitted to the preheating zone to help convert the lubricant and hasten its removal from the part.

Figure 5:
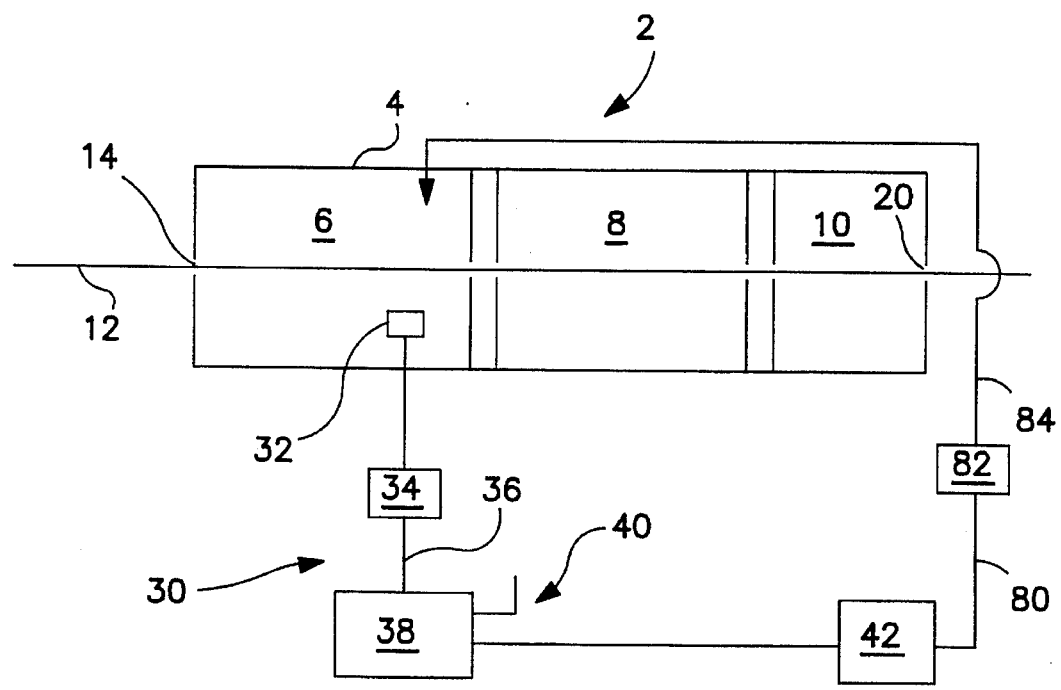
FIG. 5 is a schematic view of an embodiment of the invention in which one or more gases are added to the preheating zone to hasten removal of the lubricants.

Referring to FIG. 5, the atmosphere in the preheating zone 6 is sampled, analyzed and a signal corresponding to the detected concentration of a small gaseous compounds or total C—H bonds is produced and compared with a predetermined value as described in connection with FIG. 2. In the present embodiment, however, the third signal corresponding to the difference between the detected concentration and the predetermined concentration is sent via a conduit 80 to a flow meter control assembly 82 such as a Waukee-tronic & Valve-tronic assembly sold by Waukee Engineering Co.

The control assembly 82 sends a selected concentration of the reactive gas into the preheating zone 6 via a conduit 84. The concentration of the reactive gas sent to the preheating zone 6 is related to the amount of the vaporized lubricant present at a selected location (sample point) in the preheating zone. The slower the rate of conversion, the greater the concentration of vaporized lubricant and the greater the amount of reactive gas sent into the preheating zone.

As previously indicated, the present invention is applicable to the batchwise heat treating of parts in which preheating, heat treating and cooling are performed in a single chamber.

Figure 6:
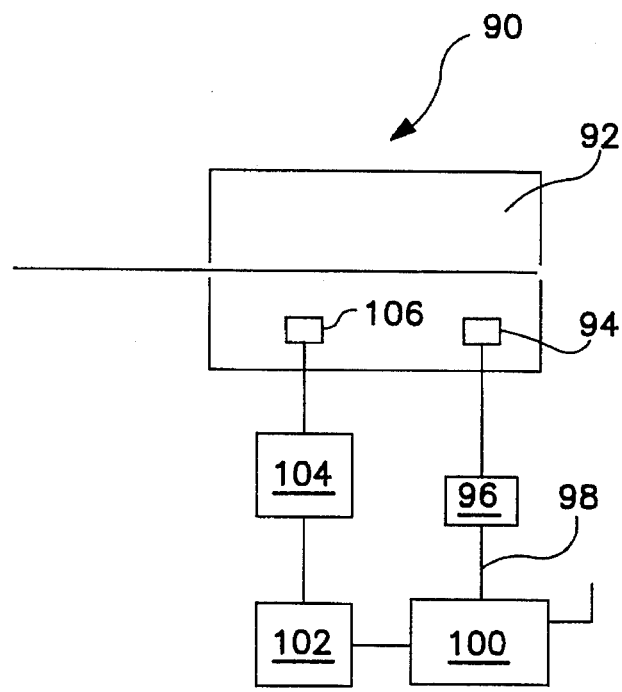
FIG. 6 is a schematic view of an embodiment of the invention for the batchwise heat treating of parts in which the temperature is controlled.

Referring to FIG. 6 there is shown a furnace 90 having a single chamber 92 for preheating, heat treating and cooling of the parts. The chamber 90 has an outlet 94 for receiving samples of the atmosphere contained therein. The samples containing by-products from the conversion of the lubricants are conveyed by a pump 96 through a conduit 98 to an analyzer 100. The analyzer sends a signal corresponding to the concentration of smaller gaseous compounds or total C—H bonds in the sample to a controller 102. The controller 102 generates a signal corresponding to the difference between the actual and predetermined concentrations.

In the embodiment specifically shown in FIG. 6 there is provided a temperature controller 104 such as Electromax V sold by Leeds & Northrup a division of General Signal which upon receiving the signal from the controller 102 transmits a signal to a heater 106 within the chamber 92 to control the temperature therein. The operation of the analyzer, controller and temperature controller is similar to that described in connection with the embodiment of FIG. 3.

Generally, it is desirable to remove substantially all of the lubricants from the parts prior to transmitting the same to the heat treating zone. The predetermined level of the smaller gaseous compounds or total C—H bonds should be set at low levels and will vary widely for different lubricants. It will be understood, however, that the present invention is applicable to any predetermined level of by-products.

EXAMPLE

A metal part made from metal powder having a composition (based on percentage by weight) of 2% copper, 0.8% carbon and the balance iron with 0.5 weight % of the lubricant, ethylene bisstearamide (Acrawax) is placed in a furnace measuring 27.5 feet in length. The furnace contains a preheating zone (approximately 6 feet in length), a heat treating zone (approximately 6 feet in length) and a cooling zone (approximately 15 feet in length), traversed by a 6 inch wide conveyor belt.

Figure 7:
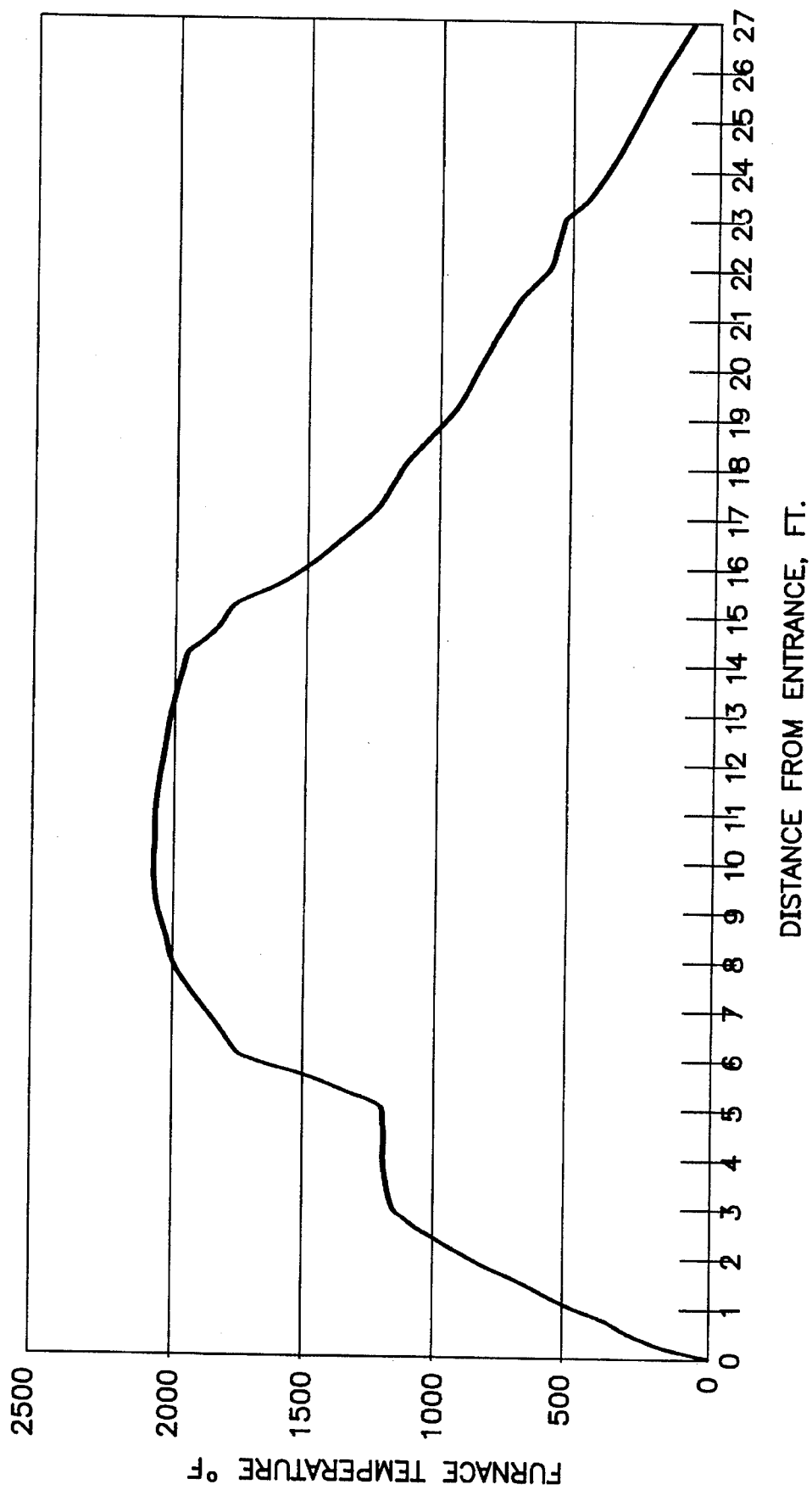
FIG. 7 is a graph showing a temperature profile of a furnace used in accordance with the continuous heat treating process of the present invention.

The metal part is exposed to temperatures within the furnace in accordance with the temperature profile shown in FIG. 7. The residence time of the metal part within the preheating zone is approximately 50 minutes.

The lubricant contained within the metal part is known to produce long chain paraffins and ethylene gas as by-products when heated to temperatures exceeding about 600° F.

The long chain paraffins are removed by filtering wherein the smaller gaseous compounds pass therethrough. The stream of smaller gaseous compounds is sent to a total hydrocarbon gas detector (Rascall II sold by the BOC Group, Inc.) where the total C—H bonds are measured.

Figure 8:
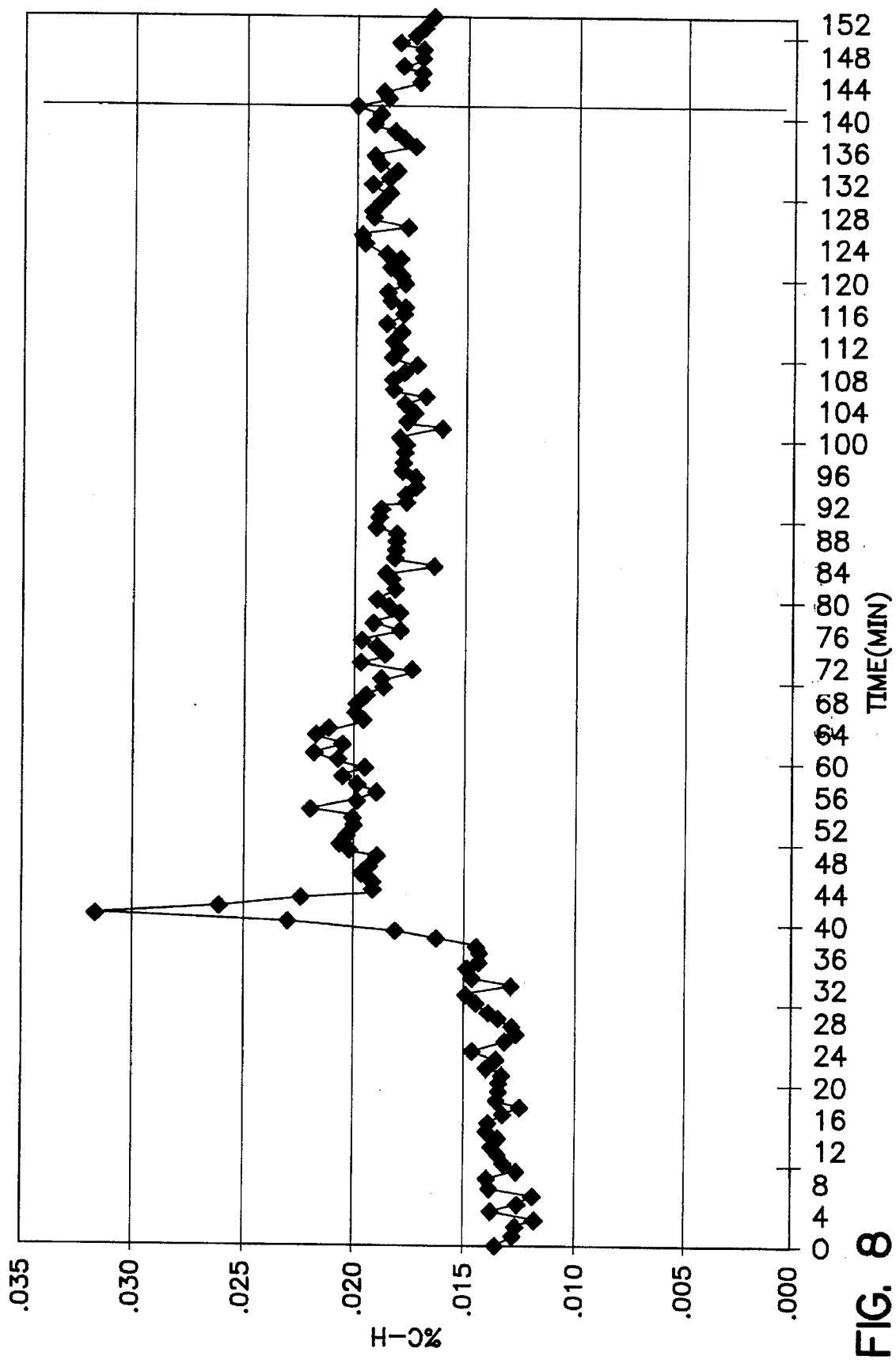
FIG. 8 is a graph showing the detected amount of C—H bonds as a function of time in accordance with an example of the present invention.

As shown in FIGS. 7 and 8, as the temperature begins to rise within the preheating zone, ethylene production commences due to the vaporization and conversion of the lubricant. The concentration of total hydrocarbons as measured by total C—H bonds and, as shown in FIG. 8, rises to a relative maximum concentration of about 0.032% by volume. The actual concentration of the measured total hydrocarbons or derivatives thereof (as measured by the total C—H bonds) begins to fall as the level of lubricant within the metal part decreases. If, for example; the desired predetermined level of total C—H bonds is about 0.02% by volume, then the preheating step need only be conducted for about 40 minutes. The speed of the conveyor can be adjusted to limit preheating to a 40 minute time period in accordance with the embodiment of the invention shown in FIG. 2.

The length of time of the preheating step can in accordance with the invention be shortened by, for example, increasing the temperature within the preheating zone and/or shortening the time it takes to reach the maximum preheating temperature.

What is claimed is:

1. A process for the heat treating of a part comprising a metal, metal alloy, ceramic or a combination thereof containing a lubricant comprising:
    a) transporting the part into a furnace;
    b) preheating the part to at least a temperature at which the lubricant vaporizes to form a preheating atmosphere containing a vaporized lubricant;
    c) converting the vaporized lubricant into at least one smaller gaseous compound during the preheating step;
    d) obtaining a sample of the preheating atmosphere;
    e) measuring a concentration of at least one smaller gaseous compound contained within the sample; and
    f) heat treating the part when the concentration of the at least one measured smaller gaseous compound reaches a predetermined value.

2. The process of claim 1 comprising conducting the preheating step in a preheating zone of the furnace and conducting the heat treating step in a heat treating zone of the furnace separate from the preheating zone.

3. The process of claim 1 comprising conducting the pretreating and heat treating steps in the same chamber of a furnace.

4. The process of claim 1 wherein the step of converting the lubricant comprises forming at least one larger gaseous compound and at least one smaller gaseous compound, said process further comprising treating the larger gaseous compound to form the same or different smaller gaseous compound.

5. The process of claim 4 wherein the step of treating the larger gaseous compound is conducted outside of the furnace.

6. The process of claim 4 comprising heating the larger gaseous compound to convert the same to at least one smaller gaseous compound.

7. The process of claim 4 comprising catalytically reacting the larger gaseous compound to convert the same to at least one smaller gaseous compound.

8. The process of claim 1 wherein the step of converting the vaporized lubricant comprises removing the vaporized lubricant from the preheating step and treating the vaporized lubricant outside of the furnace to form said at least one smaller gaseous compound.

9. The process of claim 8 comprising heating the vaporized lubricant to convert the same to said at least one smaller gaseous compound.

10. The process of claim 8 comprising catalytically reacting the vaporized lubricant to convert the same to said at least one smaller gaseous compound.

11. The process of claim 1 wherein the lubricant is comprised principally of long chain hydrocarbons or derivatives thereof.

12. The process of claim 1 wherein the smaller gaseous compound is at least one carbon-containing compound having up to 10 carbon atoms.

13. The process of claim 1 wherein the smaller gaseous compound is at least one hydrocarbon having up to 10 carbon atoms.

14. The process of claim 1 wherein the preheating step is conducted a temperature of up to 1500° F.

15. The process of claim 2 comprising transporting the part on a conveyor means into the preheating zone and transporting the preheated part on said conveyor means to the heat treating zone when the concentration of the at least one measured smaller gaseous compound reaches said predetermined value.

16. The process of claim 1 comprising controlling the degree to which the lubricant vaporizes and converts into said smaller gaseous compounds.

17. The process of claim 16 further comprising controlling the temperature of the preheating step to thereby control the degree to which the lubricant vaporizes and converts.

18. The process of claim 16 further comprising reacting the lubricant with a reactive gas to thereby control the degree to which the lubricant converts.

19. The process of claim 18 wherein the reactive gas reacts with the lubricant under the temperature conditions of the preheating step.

20. The process of claim 18 wherein the reactive gas is selected from the group consisting of oxygen-containing gases and reducing gases.

21. The process of claims 20 wherein the oxygen-containing gas is selected from the group consisting of $O_2$, $H_2O$, $CO_2$ and combinations thereof.

22. The process of claim 20 wherein the reducing gas is hydrogen gas or CO.

23. The process of claim 1 wherein the step of measuring the concentration of the smaller gaseous compound comprises:
    a) obtaining a sample of the atmosphere during the preheating of the part;
    b) generating a first signal corresponding to the concentration of the smaller gaseous compound within the sample;
    c) comparing the first signal to a second signal corresponding to said Predetermined value; and
    d) generating a third signal corresponding to the difference between the first and second signals.

24. The process of claim 23 comprising generating a first signal corresponding to the total C—H bonds contained within the sample.

25. The process of claim 23 further comprising controlling the degree to which the lubricant is removed from the part in accordance with said third signal.

26. The process of claim 23 wherein the step of controlling the degree to which the lubricant is removed comprises adjusting the residence time of the part in the preheating step.

27. The process of claim 23 wherein the step of controlling the degree to which the lubricant is removed comprises adjusting the temperature of the preheating step.

28. The process of claim 23 wherein the step of controlling the degree to which the lubricant is removed comprises reacting the lubricant with a reactive gas.

29. The process of claim 28 wherein the reactive gas is an oxygen-containing gas or a reducing gas.

30. The process of claim 1 comprising measuring the concentration of the at least one smaller gaseous compound outside of the furnace.

* * * * *